United States Patent [19]
Ledingham

[11] Patent Number: 5,310,047
[45] Date of Patent: May 10, 1994

[54] REVERSIBLE CONVEYOR RETURN GUIDE SHOE

[75] Inventor: Stuart J. Ledingham, Coto de Caza, Calif.

[73] Assignee: Valu Engineering, Inc., Irvine, Calif.

[21] Appl. No.: 972,744

[22] Filed: Nov. 6, 1992

[51] Int. Cl.$^5$ .............................................. B65G 15/60
[52] U.S. Cl. .................................................... 198/841
[58] Field of Search .......................................... 198/841

[56] References Cited

U.S. PATENT DOCUMENTS

| | | | |
|---|---|---|---|
| 3,779,368 | 12/1973 | Smith | 198/841 |
| 4,325,480 | 4/1982 | Butt | 198/841 |
| 4,720,008 | 1/1988 | Ufland | 198/841 |
| 4,898,272 | 2/1990 | Swindermann et al. | 198/841 |
| 5,190,145 | 3/1993 | Ledingham et al. | 198/841 |

OTHER PUBLICATIONS

"Catalog 10-Conveyor Components," Marbett, Aug. 1989.
"Rex-Engineering Manual," Rexnord Corp., 1990, pp. 56-74.
"New Product Bulletin-Serpentine Return System," Valu Engineering, Inc., Oct. 1991.
"Valu Guide-VG-650 Chain Return Shoe," Valu Engineering, Inc., 1988-1992.

Primary Examiner—Joseph E. Valenza
Attorney, Agent, or Firm—Knobbe, Martens, Olson & Bear

[57] ABSTRACT

A conveyor system guide shoe for guiding a conveyor chain or belt from the catenary sag onto a return way, wherein the guide shoe has multiple and reversible wear surfaces, each of the wear surfaces extending the width of the guide shoe. The guide shoe is reversible so that either one of the multiple wear surfaces can be utilized. The guide shoe also has grooves into which the wear strips of the return way can be inserted end-wise. A square support hole is provided through the center of the guide shoe for supporting the guide shoe while preventing its rotation. Support pins are also provided to secure the wear strips within the grooves of the guide shoe.

14 Claims, 6 Drawing Sheets

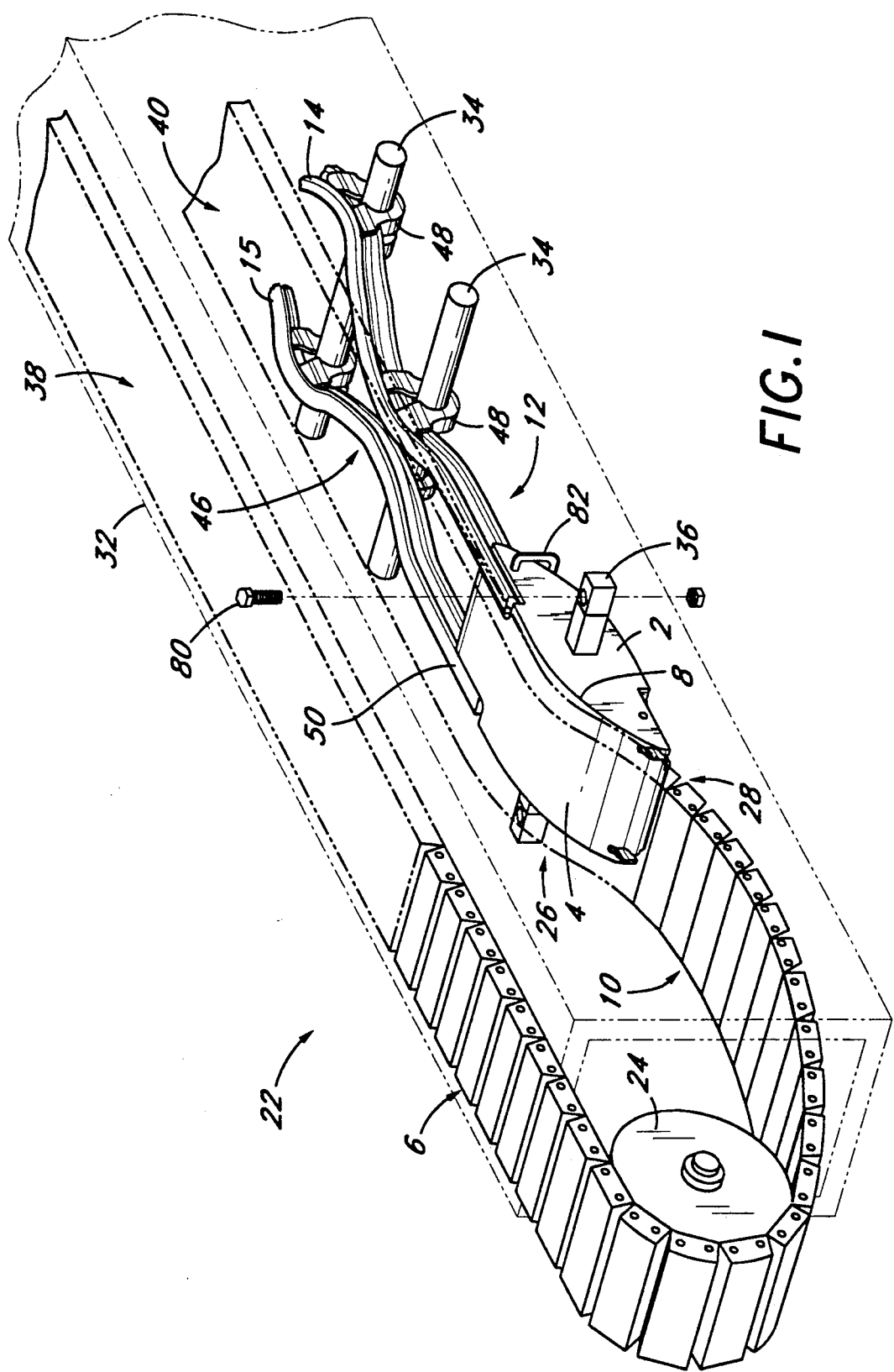

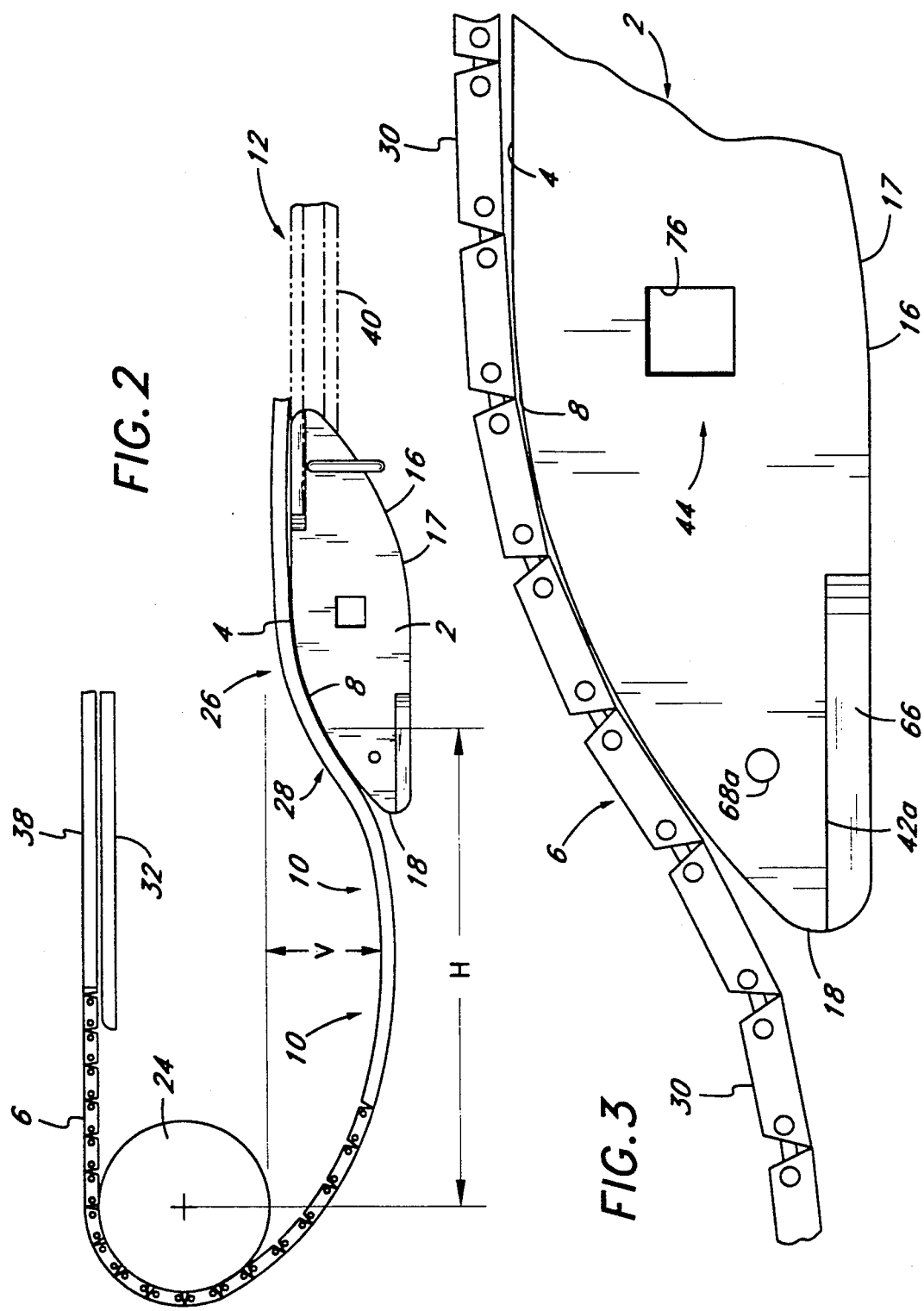

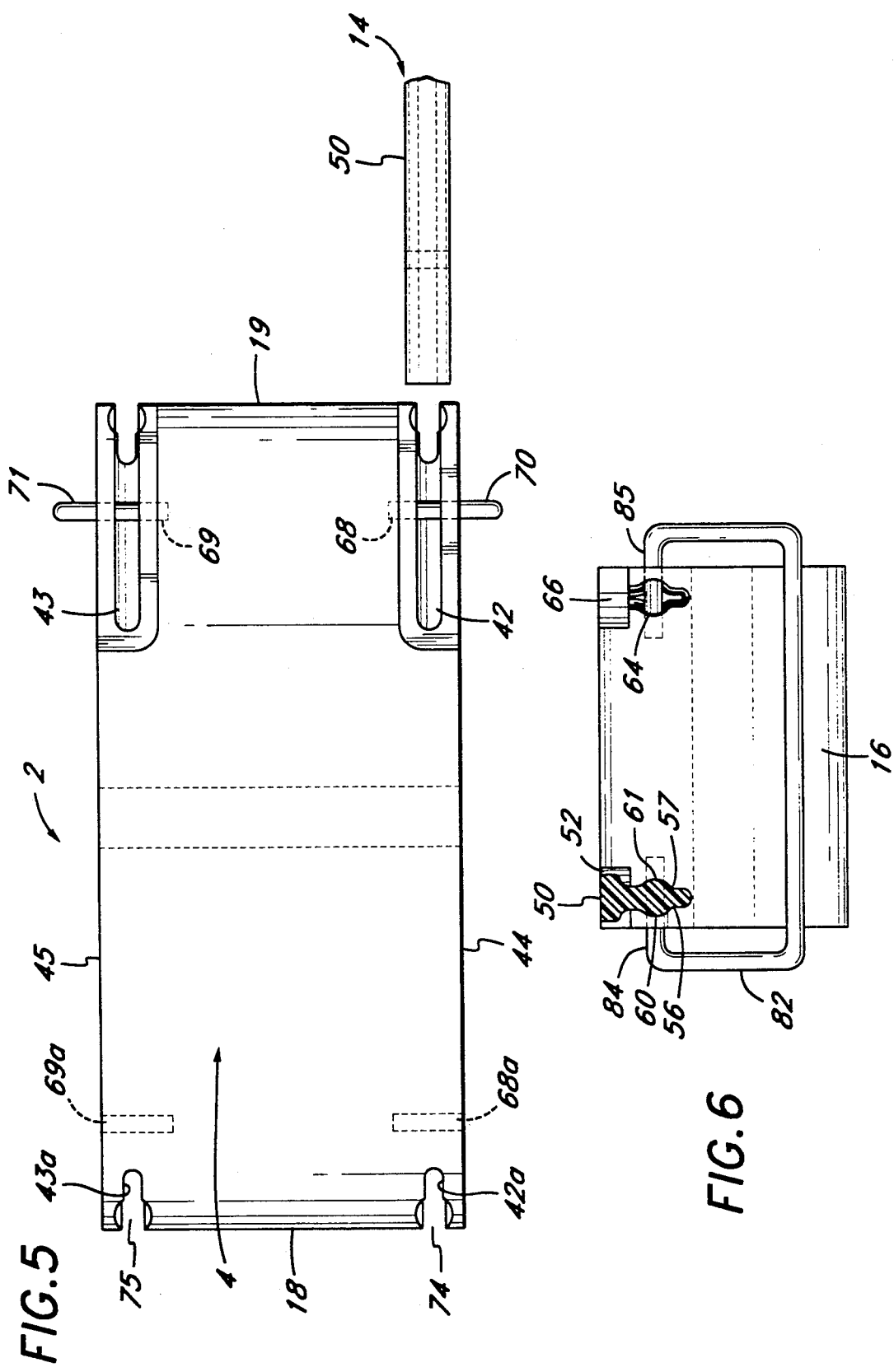

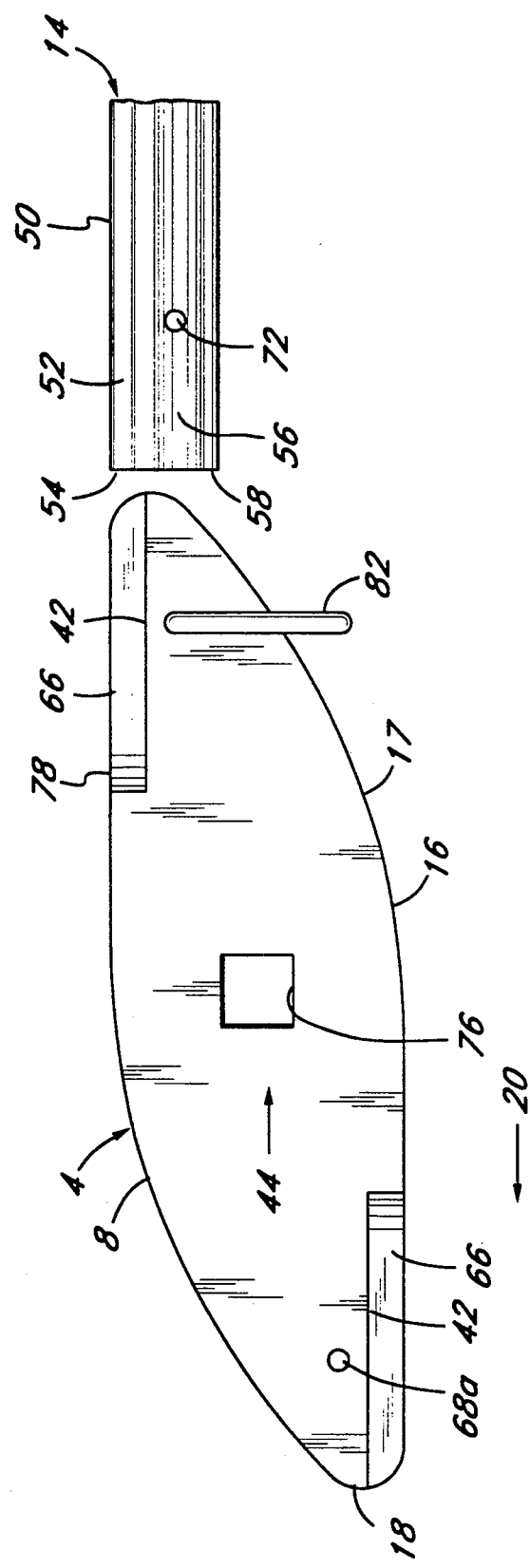

REVERSIBLE CONVEYOR RETURN GUIDE SHOE

FIELD OF THE INVENTION

The present invention relates to a conveyor system return way guide shoe, and in particular, a guide shoe that is reversible.

BACKGROUND OF THE INVENTION

Generally, conveyor systems comprise a conveyor chain or belt which moves in a generally circuitous loop, having a carrying way to support the chain or belt and a return way to support the chain or belt on its return run. The chain or belt is often made of steel or plastic, and travels in the circuitous loop about two or more sprockets, and is driven by a drive sprocket having teeth. The chain typically is adapted to flex generally in a primary direction, and to back flex in the reverse direction, although the chain typically flexes to a greater degree in the primary direction than in the reverse direction.

As the chain or belt moves along the circuitous loop, a catenary sag is provided for proper chain tension. Because conveyor chains or belts may become disengaged from the drive sprocket by excessive creeping, many chain manufacturers recommend that the chain or belt never be run tight. Thus, some sag immediately underneath the drive sprocket is normally required. The catenary sag, however, must be limited so that the entire bottom run of the chain or belt does not sag.

To limit the amount of catenary sag, standard conveyor systems comprise a return way on the bottom run of the chain or belt, which supports the chain or belt along the return run of the circuitous loop. Return ways are often comprised of wear strips which are positioned in a serpentine manner, upon which the chain or belt slides. The transition area between the catenary sag and the return way requires a guide shoe which facilitates the flexing of the chain from the primary flex to the backward flex as it moves from the front sprocket to the return way.

In the past, various types of return way guide shoes have been provided which facilitate the chain or belt's movement from the catenary sag to the return way, including a roller in combination with several other rollers comprising the return way. The problem with rollers, however, is that the rollers tended to stop rolling when they became dirty, which impeded movement of the chain, or were prone to wear out quickly.

Low friction return way guide shoes have also been provided in the past, having metal structures with plastic covers, which form the wear surface upon which the chain or belt slides. However, these guide shoes are relatively expensive to manufacture and replace, especially in view of the varying sizes and dimensions that are needed for different applications.

Recently, a return way guide shoe having a wear surface made of ultra high molecular weight polyethylene has been provided. Ultra high molecular weight polyethylene is ideally suited for this application, as it is chemical resistant, very durable, low in friction, and has high impact resistance. Though the previous return way guide shoes are useful and have many advantages, the problem is that they consisted of two separate wear surfaces, one supporting either side of the chain or belt, which tended to wear the chains or belts, particularly the plastic ones, relatively unevenly. Other guide shoes having two wear surfaces on either side have been produced in Europe in smaller sizes, but have the same problem of causing uneven wear on plastic belts or chains.

There is, therefore, a need for a guide shoe having a wear surface which extends the entire width of the chain or belt, which does not wear the plastic chains or belts unevenly. Also, there is a need for a more cost-effective return way guide shoe utilizing a material that is chemically resistant, durable, low in friction, and has high impact resistance, such as ultra high molecular weight polyethylene.

SUMMARY OF THE INVENTION

The present invention relates to a return way guide shoe that is reversible, having two or more wear surfaces, so that the guide shoe can be reversed and reused, which substantially extends the overall life of the guide shoe. The present guide shoe also has a wear surface that is continuous and can extend the entire width of the chain or belt. This continuous wear surface distributes the impact and friction of the chain or belt evenly over its entire width, eliminating the uneven wearing of grooves into the belt or chain.

One of the advantages of the guide shoe of the present invention is that it has a reversible structure. The advantage of the reversible structure is that the guide shoe can be reused by reversing the guide shoe when one wear surface becomes damaged or wears out, without having to install an entirely new guide shoe in its place. In practical applications, when a guide shoe must be replaced, the entire conveyor system must be shut down in order to replace the guide shoe. With a reversible guide shoe, a "new" wear surface is readily available. One merely has to "flip" the guide shoe over to utilize the new wear surface on the other side.

If the manufacturer forgets to stock an extra return way guide shoe, the conveyor system could be damaged or might otherwise have to be shut down for a considerable amount of time before a new guide shoe can be obtained and installed, which could create inefficiency and could cause the manufacturer a substantial loss in productivity. By having a single return way guide shoe with multiple wear surfaces, extra guide shoes need not always be stocked. Guide shoes merely have to be reversed and reinstalled, minimizing the amount of downtime experienced by the manufacturer. Once the guide shoe is reversed and reinstalled, the manufacturer has plenty of time to obtain a new guide shoe before the second surface wears out.

Another advantage of the present invention is that it comprises a wear surface that extends the entire width of the guide shoe, which in turn can extend the entire width of the chain or belt, either by itself or in multiple sets. The continuous wear surface absorbs the impact and friction of the chain or belt along the entire width of the guide shoe without wearing uneven grooves into the chain or belt. This maximizes the use and longevity of the wear surface by spreading the impact over the width of the chain or belt, and evenly distributing the load therefrom over the width of the shoe, permitting both the wear surface and the chain or belt to wear relatively evenly. Unlike previous guide shoes that have separate wear surfaces located on either side of the chain or belt putting isolated pressure thereon, the present invention relates to a continuous wear surface that can extend evenly across the entire width of the chain or belt.

The present invention also contemplates guide shoes having varying widths to accommodate different chain or belt widths. As such, the guide shoe of the present invention can be installed as a single guide shoe to suit a particular chain or belt, or in multiple sets side by side in certain applications to form essentially a single wear surface extending as wide as the conveyor system will permit.

Multiple side by side placement of guide shoes also permit multiple pairs of wear strips to be installed on the return way. A number of guide shoes can be placed side by side, to accommodate a number of pairs of wear strips on the return way.

The present invention also utilizes a square mounting hole which extends through the center of the guide shoe, which helps prevent the guide shoe from rotating. The guide shoe also advantageously has grooves into which the wear strips of the return way can be easily inserted to provide automatic spacing of the wear strips. Each of the grooves are made to coincide with the cross-sectional shape of each of the wear strips, so that the wear strips can be easily and snugly inserted. The grooves are also adapted such that the top of the wear strip is flush with the top of the wear surface, such that the chain or belt sliding on the wear surface easily makes the transition onto the wear strips.

The present invention also comprises two methods of securing the wear strips to the guide shoes. The first method includes a pin that is inserted into a hole on the side of the guide shoe, which extends through the wear strip and toward the center of the guide shoe. The second method relates to a spring pin member having two inward directing ends, which can be spread apart and inserted into the same holes on the side of the guide shoe in much the same fashion as the pins of the first method. The advantage of the spring pin member is that the pin cannot be jarred loose from the holes or accidentally pulled away.

The present invention is also easy to install and remove, which makes it easier to replace, which in turn reduces the amount of downtime experienced when the guide shoe must be reversed or replaced. The present invention is also advantageously interchangeable with existing or new systems, as it can come in any number of various widths and radius of curvatures.

BRIEF DESCRIPTION OF THE DRAWINGS

FIG. 1 is a perspective view of the present invention showing the conveyor system with a catenary sag leading onto the return way wear strips by virtue of the reversible guide shoe of the present invention positioned adjacent the wear strips.

FIG. 2 is a side view showing the catenary sag of the conveyor chain making the transition onto the guide shoe of the present invention.

FIG. 3 is a side view of the conveyor chain showing the configuration of the links which permit the chain to have a primary flex and a back flex.

FIG. 5 is a top view of the present invention showing the location of the grooves and the support holes.

FIG. 6 is an end view of the present invention showing the location of the grooves and the support holes.

FIG. 7 is a side view of the present invention showing the respective position of the support holes.

DETAILED DESCRIPTION OF THE INVENTION

Figure 4:
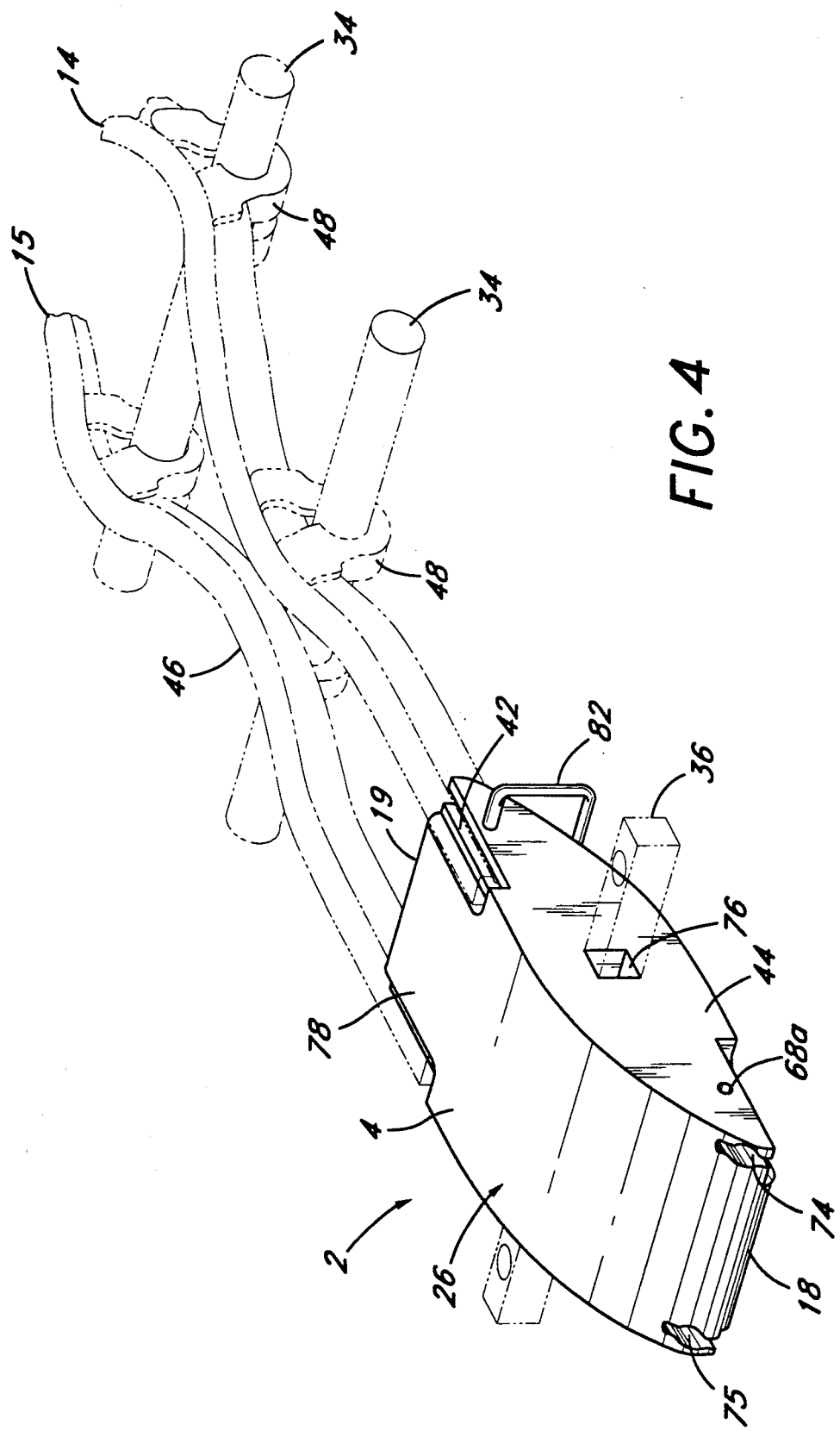
FIG. 4 is a perspective view of the present invention.

The present invention relates to a return way guide shoe preferably made of a chemically resistant, durable, low friction and high impact resistant material, having multiple and reversible wear surfaces, each extending the width of the guide shoe. The guide shoe of the present invention has multiple wear surfaces so that the guide shoe can be reused by reversing the guide shoe when one wear surface becomes damaged or wears out. Each of the wear surfaces also extend the entire width of the guide shoe, so that a comparable width chain or belt sliding thereon does not wear out unevenly.

A typical conveyor system 22 is comprised of a conveyor belt or chain 6, two or more sprockets, a carrying way 32 to support the chain or belt 6, a return way 12 to support the return run of the chain or belt, and supporting bars 34, 36. Ideally, the carrying way is supported by horizontal support bars (not shown) extending across the width of the chain or belt along the top run 38 of a conveyor system 22. Moreover, similar support bars 34 extend along the bottom run 40 and extend the entire width of the chain or belt 6 along the return way 12 to support a serpentine wear strip system 46. The front-most support bar 36 of the return way 12 is ideally suited to support the return way guide shoe 2 adjacent the catenary sag 10. This front-most support bar 36 typically extends the entire width of the chain or belt, so that a guide shoe of comparable width can be inserted thereon. The support system is also typically made so that the support bar extends a certain length with other supporting members (not shown), which prevent the guide shoe 2 from sliding width-wise on the support bar 36. If the conveyor system is relatively wide, i.e., 18 to 24 inches, several return way guide shoes can be fitted onto the front-most support bar 36 to essentially form a single wear surface extending the entire width of the belt or chain.

Typically, all chain conveyors 22 must have the proper amount of catenary sag 10 to balance the chain tension which is not absorbed by the drive sprocket 24 teeth. As can be seen in FIG. 2, the catenary sag 10 extends generally downward from and adjacent to the drive sprocket 24, and extends up to the front portion 26 of the return way 12 with the return way guide shoe 2 positioned at the transition area 28 to permit the chain to feed smoothly onto the return way 12. As known to those skilled in the art, the catenary sag 10 can vary depending upon the particular chain tension required, which is a function of chain and sprocket size, the length of the run, and the anticipated loads to be carried by the conveyor system 22. Typically, the chain or belt 6 has a catenary sag 10 in the amount of approximately 3 to 5 inches (V on FIG. 2) for conventional size conveyor systems. The typical spacing between the drive sprocket 24 and the return way 12, i.e., the distance of the catenary sag (H on FIG. 2), is between approximately 15 to 20 inches for conventional size systems. However, as will be readily apparent to those skilled in the art, these dimensions are not intended to be limitations on the present invention, as any combination of catenary sag and spacing dimensions can be utilized depending on the system being used. The typical conveyor system also has approximately a minimum 150° wrap around the front drive sprocket 24, to ensure proper exchange of movement from the drive sprocket 24 to the chain or belt 6, but this dimension may also be altered depending on the circumstances.

As can be seen in FIG. 1, the reversible guide shoe of the present invention 2 comprises a single block having a curved planar wear surface 4 upon which the chain or belt 6 slides, and two sides 44, 45. The wear surface 4 is adapted to be engaged by the chain or belt 6 and has a radius of curvature 8 sufficient to guide the belt or chain 6 having a catenary sag 10 from the front sprocket 24 onto the return way 12 and the wear strips 14, 15.

Because the present invention is reversible, a second wear surface 16 substantially identical to the first wear surface 4 is provided on the opposite side 17 of the guide shoe 2 facing the opposite direction 20. As such, when the first wear surface 4 becomes damaged or wears out, the guide shoe 2 can be flipped over to make use of the second wear surface 16, which greatly enhances the durability and wearability of the guide shoe 2.

As is also known to those skilled in the art, the guide shoe 2 should be provided with a generous entry radius of curvature 8 to the return way 12. A generous entry radius 8 permits the chain 6 to feed smoothly from the drive sprocket 24 and the catenary sag 10 onto the return way 12. As can be seen in FIG. 3, the links 30 of a conveyor chain 6 are adapted such that the chain flexes generally in a primary direction, which is the direction of flex about the drive sprocket 24, and has a back flex in the reverse direction, which is substantially more limited than the primary flex. To ensure proper feeding of the chain onto the return way 12, the radius of curvature 8 of the guide shoe 2 must be greater than the minimum back flex radius of the chain 6. Thus, as is known to those skilled in the art, the return way guide shoe 2 has a minimum entry radius which corresponds to the specific type of conveyor chain utilized in the system. In a typical system, an approximately 7" radius of curvature 8 will be sufficient. The minimum radius of curvature will vary depending upon the type and size of conveyor belt or chain being utilized, and as such, the present invention contemplates a wide range of curvature for different applications.

The wear surface 4 or 16 is formed having the curved portion at the forward end 18 (19 for the second wear surface 16), with a substantially flat portion extending toward the rear end of the wear surface. The flat portion typically extends far enough to permit a smooth transition of the chain or belt onto the return way and so that the wear strips 14, 15 can be secured properly to the guide shoe.

The material best suited for this application is chemically resistant, durable, low in friction, and has high impact resistance. In the preferred embodiment of the present invention, ultra high molecular weight polyethylene is utilized because it is chemical resistant, impact resistant, low in friction and is substantially durable. Ultra high molecular weight polyethylene is commonly referred to as UHMWPE, and was developed by Hoechst Celanese in Germany, and is sold under the name UHMWPE. The material has a molecular weight of approximately 3.0-6.0 million AMU's. However, material having similar characteristics can also be used, and the present invention is not limited to guide shoes made of UHMWPE.

Because a conveyor chain 6 typically is designed not to bend backward beyond the maximum back flex, the chain usually causes stress on the guide shoe 2 as it slides over the wear surface 4. The preferred embodiment utilizes a material, such as ultra high molecular weight polyethylene, which is self-lubricating, to make it low in friction so that the belt or chain 6 sliding over the wear surface 4 will move more smoothly, quietly and efficiently, creating less stress on the wear surface 4. The desired coefficient of friction is approximately 0.15 in most applications, or less.

The preferred material is also advantageously chemical resistant. The advantage to having a guide shoe that is chemical resistant is its resistance to soap cleaners and detergents, which are often used to clean the conveyor system, and resistance to bleaches, bug sprays and other harsh products, which might spill from the containers being carried on the conveyor during use. The preferred material is also impact resistant, which is ideal for this application, as the chain or belt tends to strike the guide shoe consistently and frequently during use. The preferred material is also light in weight and economical.

Other low friction, high impact resistant materials such as a type of acetal known as Delrin TM, or a type of polyamide known as Nylon TM, both made by Du Pont, or other materials containing fibers of glass or beads for strength can also be utilized. The primary objective of a guide shoe is to absorb the impact of the chain or belt striking the guide shoe so that less wear is experienced on the chain or belt. Rather than having to replace a chain or belt, which may cost several hundreds of dollars, it is much more economical to replace the return way guide shoe 2, which costs only several dollars to manufacture.

The reversible nature of the present invention is also advantageous because a multiple surface guide shoe 2 has at least double the wearability of previous guide shoes at approximately the same cost. Whether or not the return way guide shoe 2 has one or two wear surfaces 4, 16, the preferred embodiment of the guide shoe tends to be made of approximately the same amount of material. This is because the preferred material, ultra high molecular weight polyethylene, cannot be injection molded, screw extruded or heat formed; rather, this particular type of polyethylene is often press formed into a slab or block of material, which is then cut and/or machined into the desired shape. Though the material can be ram extruded, any effort to lower the cost of production by cutting out excess material from the guide shoe will be more than offset by the cost of having to cut and machine the material. Thus, whether the guide shoe 2 has one wear surface or multiple wear surfaces, the guide shoe is necessarily comprised of approximately the same amount of material. As such, the cost of materials for a guide shoe with one wear surface is approximately the same as the cost of materials for a guide shoe with two wear surfaces. The present invention advantageously makes cost-efficient use of the materials, which may be passed on to the consumer. Though the preferred embodiment comprises a single block of material, the present invention is not limited to this construction, as the guide shoe can also be manufactured in multiple pieces out of various materials, with a wear surface made of durable, low friction, impact resistant material.

The guide shoe 2 of the present invention also has a wear surface 4 which extends the entire width of the shoe, as can best be seen in FIGS. 1 and 4-6. As can be seen in FIG. 4, the wear surface 4 is a curved planar surface having a radius of curvature 8 extending the entire width of the guide shoe. By extending the wear surface the entire width of the shoe, the impact and friction from the chain or belt 6 engaging the guide shoe 2 is distributed evenly across the wear surface 4 to eliminate any isolated or uneven wear on the belt or chain.

In general, chains come in the following common sizes (in inches): 2, 3¼, 4, 4½, 6, 7½, 10 and 12. The present invention contemplates guide shoes having widths having sides 44, 45 to accommodate each of these sizes. In addition, chains commonly come in widths that are substantially greater, including widths of 18 inches and 24 inches. To accommodate these widths, as well as the widths of 10 inches and 12 inches, the smaller width guide shoes can be combined and installed side by side to create a continuous wear surface extending the entire width of the chain. For instance, to accommodate a chain that is 24 inches in width, two 12-inch guide shoes can be positioned side by side. When more than one guide shoe is fitted side by side onto the front support bar 36, additional pairs of wear strips can also be installed, each pair corresponding to each of the guide shoes.

The vertical dimension of the guide shoe is also typically a function of the radius of curvature of the two wear surfaces. If the radius of curvature is tight, the guide shoe must necessarily have more depth to accommodate the greater curve. If the radius of curvature is relatively large, the guide shoe can have less depth as the wear surfaces will be relatively flatter.

The guide shoe 2 of the present invention is also adapted to permit feeding of the conveyor chain 6 directly from the catenary sag 10 onto the wear strips 14, 15 of the return way 12. To perform this function, it is necessary that the wear strips 14, 15 be connected relatively flush with the wear surface 4 of the guide shoe. The present invention has longitudinal grooves 42, 43 ranging between approximately ½" to 4" long, located on either side of the wear surface 4, running parallel to and immediately inward from the sides 44, 45 of the guide shoe, extending rearward on the flat portion toward the back end of the wear surface 4. Each pair of grooves 42, 43 is adapted to connect the guide shoe 2 to a pair of wear strips 14, 15 and provides automatic spacing of the wear strips 14, 15. The preferred embodiment of the guide shoe of the present invention has two separate pairs of grooves 42, 43 and 42a, 43a located at the rearward end of each wear surface 4, 16, four in all, into which each of the separate wear strips 14, 15 can mate.

Wear strips 14, 15 are often formed of the same ultra high molecular weight polyethylene material, and are mounted in a serpentine manner to provide the return way for the conveyor system 22. They can also be made of acetal (Delrin TM) or any other material, as discussed, used to make the guide shoe. The wear strips 14, 15 in the preferred embodiment have a cross-sectional configuration which is adapted to be mounted by mounting clips 48, much like those disclosed in my previous U.S. application Ser. No. 07/790,672. Each of the wear strips 14, 15 have a wear surface 50 extending longitudinally along the upper edge 54 which engages the chain or belt 6 on the return way portion of the system. The wear surface 50 of the wear strip is essentially comprised of a head portion 52 which is located along the upper edge 54 of the wear strip. On the sides of the wear strip 56, 57, located mid-way between the head portion 52 and the lower end 58 of the wear strip, are generally arcuate projections 60, 61, each extending longitudinally along each side of the wear strips 14, 15, as can be seen in FIG. 6. Each of these arcuate projections 60, 61 project outward from the sides of the wear strip 56, 57 and are diametrically opposed to each other and spaced an equal distance from the center line of the wear strip. Also, each of these arcuate projections 60, 61 are preferably, in cross-sectional configuration, a segment of a circle.

The grooves 42, 43 and 42a, 43a located at the rearward end of each wear surface 4, 16 each have a cross-sectional configuration 64 which matches the cross-sectional configuration of the wear strips 14, 15 such that the wear strips can be inserted endwise into the grooves. This permits the wear strips 14, 15 to be easily mounted with respect to the guide shoe 2. The cross-sectional configuration 64 of the grooves is a mirror image of the middle and bottom portions of the wear strips 14, 15 so that the grooves mate and bond with the arcuate projections 60, 61. Though in this preferred embodiment, the cross-sectional configuration of the wear strips 14, 15 is designed to mate with the aforementioned mounting clips 48, one skilled in the art will see that any cross-sectional configuration which permits the wear strip to be connected to the guide shoe is possible.

Also, in the preferred embodiment, each groove 42, 43 and 42a, 43a is counter-sunk, as shown in 66, to permit the head portion 52 of the wear strips 14, 15 to be flush with the wear surface 4 of the guide shoe. The grooves are counter-sunk so that the wear surface 50 of the wear strip is flush with the wear surface 4 of the shoe. The width of the counter-sunk portion 66 of the groove is preferably larger than the width of the head portion 52 of the wear strip to allow for expansion.

The guide shoe of the present invention also has bores 68, 69, through which connecting pins 70, 71 and 82 can be inserted. The bores 68, 69 are located adjacent the grooves 42, 43 on the sides of the guide shoe 44, 45, extending transverse to the grooves and parallel to the guide shoe wear surface 4. The bores 68, 69 are positioned approximately mid-way within the grooves, both horizontally and vertically. The bores 68, 69 also extend axially inwardly through the grooves toward the center of the guide shoe 2 so that the pins 70, 71 or 82 can extend partially into the center portion of the guide shoe.

Identical grooves 42a, 43a and identical bores 68a, 69a are located on the reverse side 17 of the guide shoe, at the rearward end of the second wear surface 16 (front end of first wear surface). In fact, as can be seen in FIG. 4, the openings 74, 75 of the grooves at the rearward end of the second wear surface 16 actually extend out the forward end 18 of the first wear surface 4 when the first wear surface is in use. However, the forward end 18 of the first wear surface is rounded, and the openings 74, 75 do not impede the chain or belt's 6 movement on the first wear surface 4.

In use, the guide shoe 2 is positioned such that only one wear surface 4 or 16 is engaged at one time, with a pair of wear strips 14, 15 inserted into the associated grooves at the rearward end of the wear surface in use. The second wear surface 16 remains on the reverse side 17 with the empty pair of grooves 42a, 43a on the bottom of the guide shoe with the openings 74, 75 facing out the forward end of the first wear surface 4.

The guide shoe 2 also advantageously has a support hole 76 which resists rotation. A substantially square hole 76 extends longitudinally through the guide shoe 2 from one side 44 to another side 45 running parallel to the wear surfaces 4, 16. The support hole 76 is also substantially centered with respect to the length of the wear surface 4 or 16 to provide a well-balanced connection. The support hole 76 is also centered vertically so that the shoe 2 can be supported by the same hole whether the first or second wear surface is being used.

Typically, a conveyor system 22 has a return way 12 having support bars 34 which support the wear strips 14, 15. At the end 26 closest to the drive sprocket 24, the return way 12 typically has a support bar 36 which can be used to support the guide shoe 2. In the preferred embodiment, this support bar 36 has a square cross section onto which the guide shoe 2 can be installed, as shown in FIG. 1. In the preferred embodiment, the support hole 76 is designed to mate with the square support bar 36, and to fit relatively snugly. However, in applications where existing support bars are not square, the guide shoe of the present invention could be secured to a round support bar. The rotation in this situation could be prevented by the connection of the guide shoe to the wear strips, although a square support bar is desirable.

The return way guide shoe 2 can also be properly and easily installed onto the square support bar 36 without much adjustment. This, in turn, reduces the amount of down time that may be experienced when the guide shoe must be reversed or replaced. Also, multiple guide shoes can easily be installed side by side (not shown).

To install the guide shoe of the present invention, the support bar 36, which is typically fastened by a bolt or screw 80 to the return way 12, can be easily removed. The support bar 36 is typically drilled and tapped at the ends, and a bolt, in line with the center line of the bar, is provided. After removing the screw or bolt, the guide shoe 2 is then slid onto one end of the support bar 36. Once the support bar 36 is inserted into the support hole 76 of the guide shoe, the support bar 36 can be realigned and reconnected by tightening the screw or bolt 80 on the return way.

The wear strips 14, 15 can then be inserted into the grooves 42, 43 so that the hole 72 is aligned with the bores 68, 69. The pins 70, 71 or 82 are then inserted to secure the wear strips 14, 15. To remove the guide shoe, the pins can be removed, the wear strips pulled, the screws or bolts loosened and the guide shoe removed from the support bar 36.

The present invention also incorporates two different methods of securing the wear strips 14, 15 to the guide shoe 2 so that the wear strips 14, 15 will not become loose due to vibration or other reasons. The first method relates to a straight pin 70 or 71 which can be inserted into one of the bores 68 or 69 on the side of the guide shoe. To install a wear strip 14 or 15 into one of the guide shoe grooves 42 or 43, the wear strip 14 or 15 is inserted endwise into the end opening of a groove, so that the hole located on the side of the wear strip, shown as 72 in FIG. 7, aligns with the bore 68 or 69 located on the side of the guide shoe. Once the hole 72 and bore 68 or 69 are aligned, the pin 70 or 71 can be inserted into the guide shoe 2, through the bore 68 or 69 and the wear strip 14 or 15, and into the portion of the bore 68 or 69 which extends partially toward the center of the guide shoe. The diameter of the bore 68 or 69 and the diameter of the pin 70 or 71 are substantially identical so that the pin 70 or 71 fits snugly within the bore 68 or 69. In the preferred embodiment, the bore 68 or 69 is $\frac{1}{4}$" in diameter.

The second method relates to a spring pin 82, which is a single pin member which can be spread apart. As can be seen in FIG. 6, the spring pin 82 has inwardly directing ends 84, 85 which can be spread apart and inserted over and into the bores 68, 69 on the sides of the guide shoe 44, 45. The advantage of the spring pin 82 is that the structure of the pin prevents the pin from being jarred out of the bores or accidentally pulled away.

The present invention is also advantageously interchangeable with existing or new systems. The present invention has a square hole 76 into which a rod or support bar of an existing system can be extended to support the guide shoe relative to the return way. The existing rod or bar can be replaced with a square bar 36 that matches the square hole 76 of the guide shoe 2.

Figure 8:
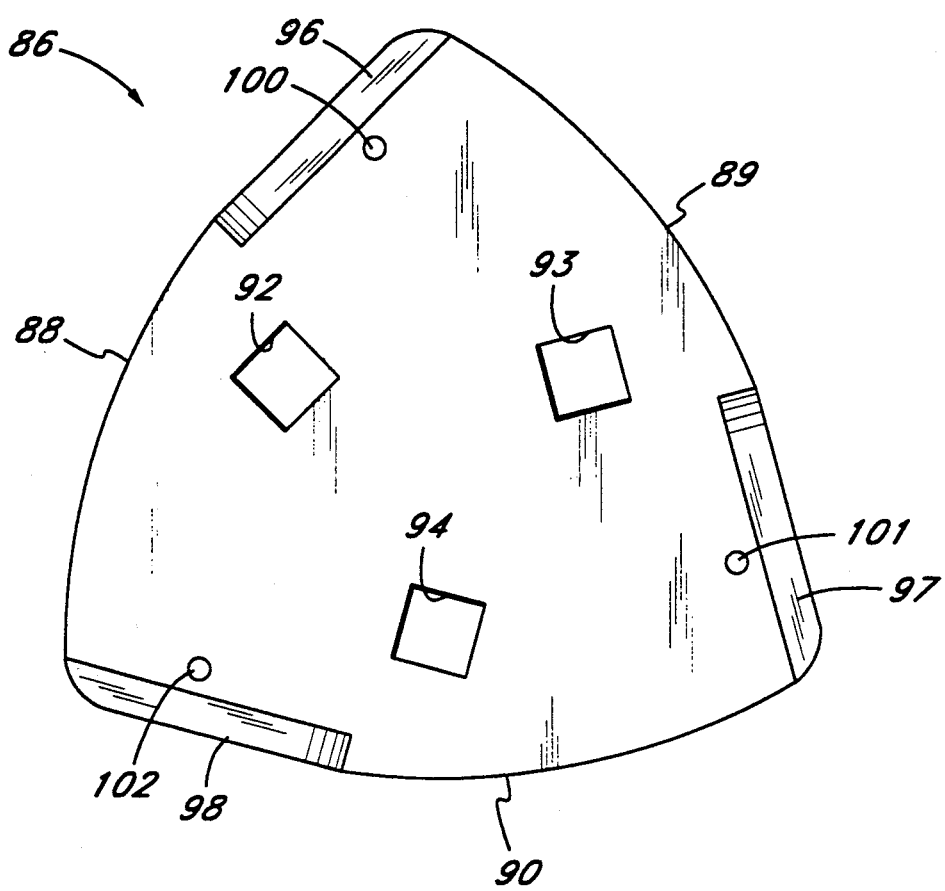
FIG. 8 shows an alternate embodiment of the present invention having a three-side reversible structure.

In an alternate embodiment of the present invention, the guide shoe can be adapted to have more than two wear surfaces. As shown in FIG. 8, a three-sided reversible guide shoe 86 having three separate wear surfaces 88, 89, 90 can be provided to achieve the benefits discussed herein. In such case, three separate square support holes 92, 93, 94 can be provided so that each of the wear surfaces will be properly aligned with the support bar 76. In another embodiment (not shown), a triangular support hole can be provided at the center of the three-sided guide shoe so that a triangular support bar can be extended therethrough. In this embodiment, the triangular support hole can be aligned so that each of the three wear surfaces will be aligned properly with the return way.

In this alternate embodiment, with the three-sided reversible guide shoe 86, each of the wear surfaces 88, 89, 90 will have a pair of grooves 96, 97, 98 positioned parallel with respect to the side of the guide shoe extending longitudinally along the rearward end of each wear surface, much like in the two-sided guide shoe 2. Each pair of grooves 96, 97, 98 will be adapted much in the same fashion as discussed previously, so that a pair of wear strips can be inserted therein. The same connecting bores 100, 101, 102 can also be provided so that the same pins 70, 71, 82 can be utilized to secure the wear strips 14, 15 within the grooves.

The above description of the present invention and its embodiments should not be construed to be limited solely to the reversible guide shoes discussed herein. Instead, the present invention should only be limited by the claims which follow.

I claim:

1. A conveyor return way guide shoe being attachable to the return way of a conveyor system for guiding a conveyor belt or chain from the catenary sag to the return way wear strips, comprising:

a first surface adapted to be engaged by said conveyor belt or chain, said first surface having a forward portion and a rearward portion, said forward portion having a curvature sufficient to guide said conveyor belt or chain from said catenary sag onto said wear strips, and said rearward portion being substantially planar;

a second surface substantially similar in shape to said first surface, said second surface also having a forward portion and a rearward portion, said second surface being located on said guide shoe on a side opposite that of said first surface and being oriented such that said forward portion of said second surface is proximate said rearward portion of said first surface, and said rearward portion of said second surface is proximate said forward portion of said first surface, said shoe being reversible such that said shoe can be utilized with either said first surface or said second surface engaging said belt or chain.

2. The conveyor return way guide shoe of claim 1, wherein said first surface is oriented in one direction and said second surface is oriented in a second direction which is opposite said first direction.

3. The conveyor return way guide shoe of claim 1, wherein one or more grooves are located on said rearward portions of said first and second surfaces, said grooves being countersunk so that the upper edge of each of said wear strips are flush with said surfaces.

4. The conveyor return way guide shoe of claim 3, wherein the cross-sectional configuration of said grooves substantially match the cross-sectional configuration of said wear strips, such that said wear strips can be easily inserted endwise into said grooves.

5. The conveyor return way guide shoe of claim 1, wherein said guide shoe is made of ultra-high molecular weight polyethylene.

6. The conveyor return way guide shoe of claim 5, wherein a support hole for securing said wear strips to said guide shoe is provided, wherein a pin is adapted to be inserted into said support hole to secure said wear strip to said guide shoe.

7. The conveyor return way guide shoe of claim 6, wherein said pin is an elongated shaft.

8. The conveyor return way guide shoe of claim 6, wherein said pin comprises two inwardly directed elongated shafts, adapted such that by spreading said inwardly directed elongated shafts apart, said pin can be inserted onto two of said support holes.

9. The conveyor return way guide shoe of claim 1, wherein one or more grooves are positioned longitudinally on each of said surfaces, said grooves being adapted to secure said wear strips to said guide shoe.

10. The conveyor return way guide shoe of claim 1, wherein a support means for supporting said guide shoe to said return way is provided.

11. A conveyor system guide shoe to be positioned at the front-most portion of the return way, comprising:
   a first wear surface, said first wear surface being adapted to engage a chain or belt of said conveyor system and to guide said chain or belt from the catenary sag onto the wear strips of the return way;
   a second wear surface substantially identical to said first wear surface;
   a third wear surface substantially identical to said first and second wear surfaces, said first, second and third wear surfaces being located along the perimeter of said guide shoe equidistant from the center of said guide shoe; and
   one or more grooves for securing said wear strips to said guide shoe.

12. A conveyor return way guide shoe being attachable to the return way of a conveyor system for guiding a conveyor belt or chain from the catenary sag to the return way wear strips, comprising:
   a substantially vertically oriented left side;
   a substantially vertically oriented right side;
   an upper wear surface adapted to engage said conveyor belt or chain and to guide said conveyor belt or chain from the catenary sag onto the wear strips of the return way, said upper wear surface extending continuously from said right side to said left side; and
   a second war surface located on the reverse side of said guide shoe, said second wear surface also being adapted to engage the conveyor belt or chain and to guide said conveyor belt or chain from the catenary sag onto the wear strips of the return way, said second wear surface also extending continuously from said left side to said right side;
   wherein said guide shoe is reversible such that either said upper wear surface or said second wear surface can be utilized to guide said conveyor belt or chain onto said wear strips, wherein said upper wear surface is oriented such that said conveyor belt or chain moves across thereon in a first direction, said upper wear surface having a curved front portion and a substantially planar rear portion relative to said first direction, wherein said second wear surface has a curved front portion and a substantially planar rear portion, said curved front portion of said second surface being adjacent said planar rear portion of said upper surface, and said planar rear portion of said second surface being adjacent said curved front portion of said upper surface.

13. The conveyor return way guide shoe of claim 10, wherein said support means is a square bore extending longitudinally through said guide shoe from one side to another side running parallel to said first and second surfaces.

14. The conveyor return way guide shoe of claim 9, wherein said grooves are parallel to each other on each of said surfaces, and extend rearward on the rearward portion of each of said first and second surfaces.

* * * * *